(12) United States Patent
Mattela

(10) Patent No.: US 9,888,096 B1
(45) Date of Patent: Feb. 6, 2018

(54) MULTI-PROTOCOL PROCESSOR FOR MOBILE AUTOMOTIVE NETWORKS

(71) Applicant: Redpine Signals, Inc., San Jose, CA (US)

(72) Inventor: Govardhan Mattela, Hyderabad (IN)

(73) Assignee: Redpine Signals, Inc., San Jose, CA (US)

( * ) Notice: Subject to any disclaimer, the term of this patent is extended or adjusted under 35 U.S.C. 154(b) by 0 days.

(21) Appl. No.: 15/485,492

(22) Filed: Apr. 12, 2017

Related U.S. Application Data

(60) Provisional application No. 62/432,097, filed on Dec. 9, 2016.

(51) Int. Cl.
| | |
|---|---|
| *H04B 1/38* | (2015.01) |
| *H04M 1/00* | (2006.01) |
| *H04L 29/06* | (2006.01) |
| *H04W 72/04* | (2009.01) |
| *H04W 4/00* | (2009.01) |
| *H04W 84/12* | (2009.01) |
| *H04W 88/06* | (2009.01) |

(52) U.S. Cl.
CPC ............. *H04L 69/18* (2013.01); *H04W 4/008* (2013.01); *H04W 72/0406* (2013.01); *H04W 84/12* (2013.01); *H04W 88/06* (2013.01)

(58) Field of Classification Search
CPC .. H04L 69/18; H04W 4/008; H04W 72/0406; H04W 84/12; H04W 88/06
See application file for complete search history.

(56) References Cited

U.S. PATENT DOCUMENTS

| | | | |
|---|---|---|---|
| 2010/0261438 A1* | 10/2010 | Walley ................. | H04B 1/0003 455/77 |
| 2014/0350793 A1* | 11/2014 | Schrabler ............... | G01S 7/006 701/41 |
| 2017/0160318 A1* | 6/2017 | Zhang ................ | G01R 19/0038 |

* cited by examiner

*Primary Examiner* — Nguyen Vo
(74) *Attorney, Agent, or Firm* — File-EE-Patents.com; Jay A. Chesavage

(57) ABSTRACT

A multi-protocol transceiver provides a plurality of RF front ends, each responsive to a particular protocol and frequency, a common set of analog/digital converters, a baseband processor which receives and demodulates and also modulates and transmits baseband wireless packets for mixing to a carrier frequency by each RF front end. A timing controller allocates intervals of time for a first protocol such as WAVE protocol, and also allocates exclusive intervals of time for a second protocol such as Bluetooth.

18 Claims, 3 Drawing Sheets

Fig. 4A

| 402 T1 | 404 Tg | 406 T2 | 408 Tg | 410 T1 | 412 Tg |
|---|---|---|---|---|---|
| 802.11p(CCH) | Bluetooth<br>802.11b/g/n/ac<br>ZigBee | 802.11p(SCH) | Bluetooth<br>802.11b/g/n/ac<br>ZigBee | 802.11p(CCH) | Bluetooth<br>802.11b/g/n/ac<br>ZigBee |

Fig. 4B

| 402 T1 | 404 Tg | 406 T2 | 408 Tg | 410 T1 | 412 Tg |
|---|---|---|---|---|---|
| 802.11p(CCH) | Bluetooth | 802.11p(SCH) | 802.11b/g/n/ac | 802.11p(CCH) | ZigBee |

Fig. 4C

| 402 T1 | 404 Tg | 406 T2 | 408 Tg | 410 T1 | 412 Tg |
|---|---|---|---|---|---|
| Bluetooth<br>802.11b/g/n/ac<br>ZigBee | Bluetooth | 802.11p(SCH) | Bluetooth<br>802.11b/g/n/ac<br>ZigBee | Bluetooth<br>802.11b/g/n/ac<br>ZigBee | Bluetooth<br>802.11b/g/n/ac<br>ZigBee |

MULTI-PROTOCOL PROCESSOR FOR MOBILE AUTOMOTIVE NETWORKS

The present patent application claims priority to U.S. provisional patent application 62/432,097 filed Dec. 9, 2016.

FIELD OF THE INVENTION

The present invention relates to a dual use transceiver and baseband processor. In particular, the invention relates to an architecture for an RF front end and baseband processor for handling simultaneous data communications compliant with IEEE 802.11p as well as at least one other protocol such as Bluetooth® wireless protocol, 802.11b/g/n wireless local area network (WLAN), or ZigBee protocol wireless network.

BACKGROUND OF THE INVENTION

Automotive networks are a recently deployed type of network designated by the Institute of Electrical and Electronics Engineers (IEEE) by the standard 802.11p. Certain fundamental aspects of the WAVE standard are: the use of a dedicated radio frequency (RF) spectrum in the 5.8 Ghz range, the use of freely associating stations which do not rely on an association protocol, and a first set of generally fixed-location wireless devices known as roadside equipment (RSE), and a second set of generally mobile vehicular-sited wireless devices known and on-board equipment (OBE). The RSE and OBE may communicate with each other in particular fixed time intervals of time, which may be dedicated use, multiplexed by frequency, or multiplexed in time to provide shared access. A time multiplexing aspect provides a series of fixed communication intervals for each type of station.

Because of the distributed and non-centralized nature of this type of network, the RSE and OBE equipment utilize a series of repeating time windows which provide for devices to access the network, where the window timings are governed by a uniform time corrected (UTC) clock, and where each station synchronizes to a time server or uses a GPS signal source to determine UTC time, which establishes the transmit windows under 802.11p.

A problem arises where it is desired to add additional communication services alongside 802.11p which are integrated into the 802.11p connectivity and accessory services, such as Bluetooth (described in www.bluetooth.org standards), WLAN (Wireless Local Area Network, described by the IEEE 802.11 series of standards), or ZigBee (described in www.zigbee.org standards). Although each of these RF communications protocols operate in respective RF frequency channels which are distinct from 802.11p, a separate set of baseband processors for each separate protocol is needed, as the 802.11p protocol does not provide for integration with these other wireless network types, where each wireless network protocol has its own frequency of operation, modulation type, association sequence, and ISO layer 2 and layer 3 protocols. This hardware burden has the effect of requiring that each wireless protocol have a separate RF transceiver, layer 1 PHY and layer 2 MAC, thereby greatly increasing the current consumption of the transceiver for support of just two protocols.

It is desired to provide a baseband processor and method of operation which provides combined 802.11p transceiver operation with at least one other protocol, such as Bluetooth, any of the WLAN protocols (IEEE 802.11a, b, g, n, or ac), or ZigBee (IEEE 802.15.4).

OBJECTS OF THE INVENTION

A first object of the invention is a transceiver for multi-protocol wireless signals, at least one of the wireless signals conforming to the IEEE 802.11p standard, the wireless transceiver comprising:

a timing controller for identifying 802.11p communications intervals and guard intervals;

a plurality of RF front ends, each RF front end operative for a particular frequency, each RF front end having a receive chain coupled to an antenna through a transmit/receive switch, each RF front end comprising a preamplifier, baseband mixer operative at a particular frequency for a particular protocol, and low pass filter generating a receive output, each RF front also having a transmit chain comprising a transmit input coupled to a mixer, thereafter to power amplifier coupled to the TR switch;

a receive multiplexer coupled to each RF front end receive output selecting a particular RF front end receive output based on said timing controller;

a transmit multiplexer coupled to each RF front end transmit output and selecting a particular RF front end transmit input based on said timing controller;

a multi-protocol baseband processor coupled to said timing controller, said baseband processor operative as an 802.11p baseband processor during 802.11p intervals, said baseband processor operative for a at least one of: Bluetooth, any of the WLAN protocols (IEEE 802.11a, b, g, n, or ac), or ZigBee (IEEE 802.15.4).

SUMMARY OF THE INVENTION

The present invention provides a multi-protocol transceiver for WAVE (802.11p protocol) and at least one other protocol such as Bluetooth, 802.11a, 802.11b, 802.11g, 802.11n, 802.11ac or ZigBee. A timing controller operative with GPS time or network time protocol (NTP) extracts the coordinated universal time (known as UTC) and thereby identifies WAVE protocol intervals and gap intervals.

A timing controller identifies usable guard intervals for a particular protocol such as 802.11p. A plurality of RF front ends, one for each RF frequency or communications protocol, each receives wireless packets and provides analog baseband symbol streams for digitization and for processing by a baseband processor which is operative on a particular type of baseband symbol stream (such as DSSS of 802.11a, the modulation method used in 802.11p) or Bluetooth frequency hopping PHY protocol, for example), with the baseband processor alternating between operation as 802.11p during WAVE protocol intervals, and Bluetooth protocol during gap intervals, with the associated RF front end and baseband processor and MAC multiplexed accordingly. In one example of the invention, the baseband processor may be operative exclusively as a Bluetooth processor during an initial pairing interval for the duration of time required to complete the Bluetooth pairing and form a Bluetooth connection, and after Bluetooth pairing is completed, the baseband processor is operative in a dual mode manner, such that the baseband processor is operative for transmitting and receiving 802.11p packets during CCH and SCH intervals, and is operative transmitting bursts of Bluetooth packets during the gap (Tg) intervals between CCH and SCH intervals to stream audio content, for example.

BRIEF DESCRIPTION OF THE DRAWINGS

FIGS. 4A, 4B, and 4C shows a timing diagram for multi-protocol configuration intervals.

DETAILED DESCRIPTION OF THE INVENTION

Figure 1:
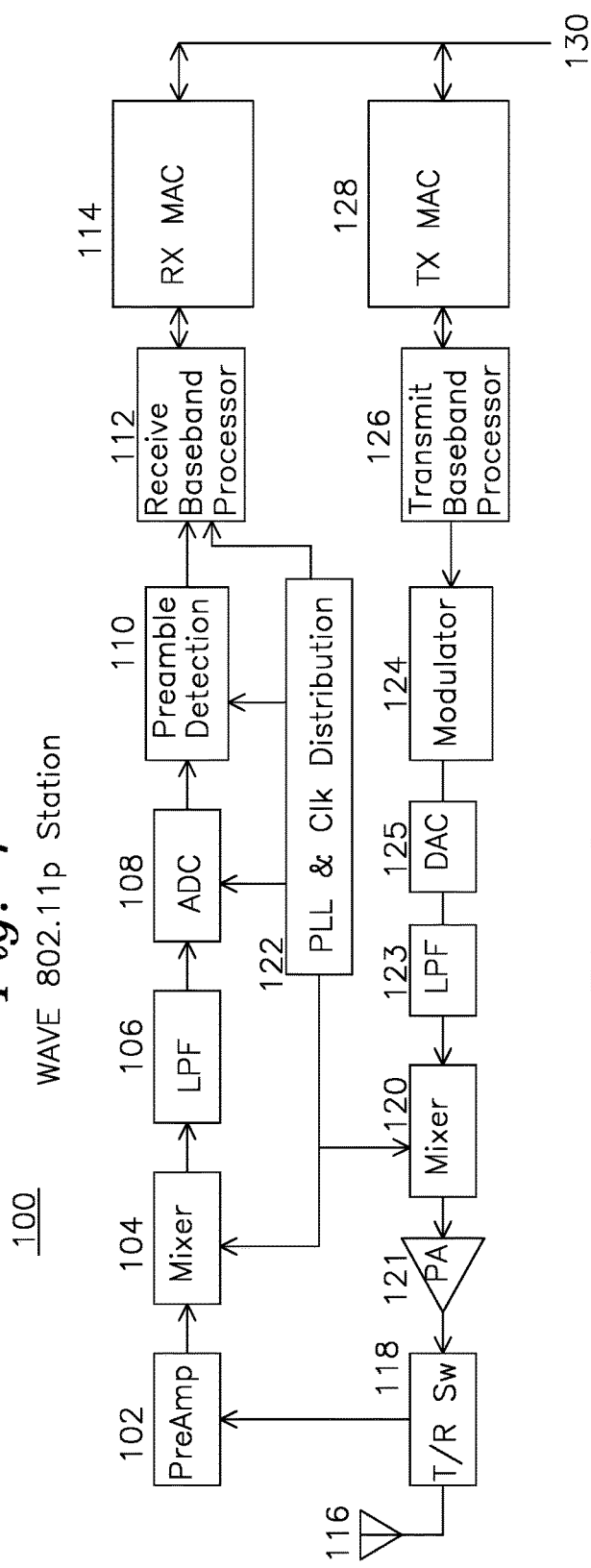
FIG. 1 shows a block diagram of an RF front end and signal processor for 802.11p.

FIG. 1 shows an example 802.11p station. An antenna 116 is coupled to a transmit/receive switch 118, thereafter to preamplifier 102, mixer 104, low pass filter 106, analog to digital converter ADC 108, preamble detection 110, receive baseband processor 112, which demodulates the baseband symbols to a stream of data which is provided to receive media access controller (MAC) 114, which includes a computer interface 130 such as a synchronous data (SD) interface, a peripheral computer interface (PCI), or other interface to a computer or other device receiving the data. The transmit chain comprises the transmit MAC 128, which forms packets of data to transmit, the transmit baseband processor 126, modulator 124, digital to analog controller DAC 125, low pass filter 127, mixer 120, RF power amplifier 121, and TR switch 118, which is coupled to the antenna 116. PLL and clock distribution 122 maintain the transmit and receive clocks for mixing RF to baseband on receive, mixing to carrier frequency for transmit, as well as controlling the rate of movement of data through the processing system.

Figure 2:
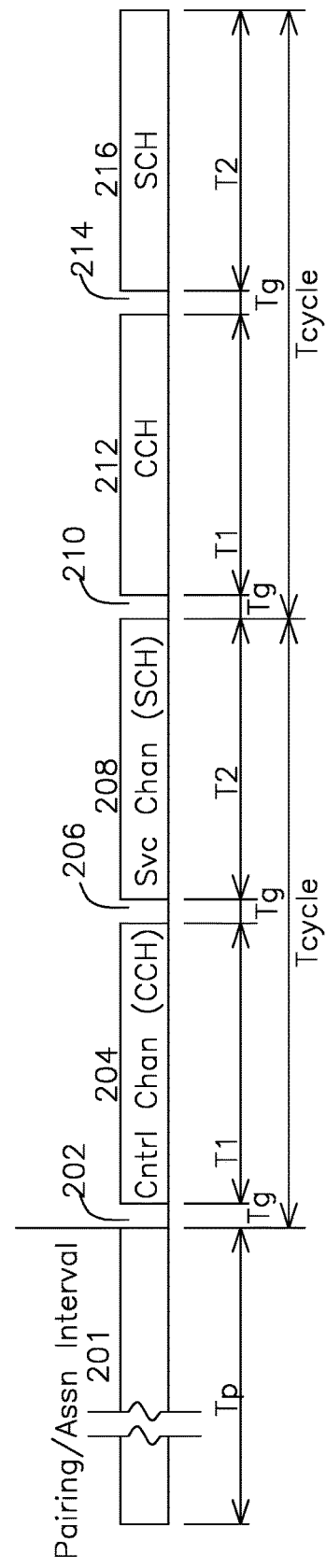
FIG. 2 shows a timing diagram for 802.11p.

FIG. 2 shows an example of the time multiplexed protocol of the 802.11p Wireless Access in Vehicular Environments (WAVE), which is divided into channel intervals comprising control channel (CCH) intervals 204 & 212, and Service channel (SCH) 208 & 216 intervals, which continuously alternate as shown. A WAVE device is based on an architecture that supports a Control CHannel (CCH) and multiple Service CHannels (SCH). The CCH is used to transmit Wave Short Messages (WSMs) and announce WAVE services, and the SCH are used for application interactions and transmissions over IP. WAVE devices operate in 5.85-5.925 GHz DSRC frequency band in the US, with 10 MHz channel spacing and 10 MHz of channel bandwidth. Due to the reduced channel bandwidth, the maximum physical data rate will reduce to 27 Mbps. This band also supports two 20 MHz wide service channels for higher data rates. Each WAVE device monitors the CCH (such as 204 and 212 of FIG. 2) beginning at the start of a UTC second, and the channel switches to SCH (such as 208 and 216 of FIG. 2) at the end of CCH (204, 212) interval. At the beginning of each scheduled control (CCH) or service (SCH) channel interval, there is a guard interval (Tg 202, 206, 210, 214 of FIG. 2). This Tg guard interval provides compensation for channel switch time, inaccuracy in synchronization of the stations to UTC, and is used to account for variations in channel interval time, as well as timing inaccuracies among different devices, and to provide an inter-transmit gap between transmissions from each device type.

A problem which arises is that an RF front end and baseband processor for WAVE protocol devices is difficult to integrate into other protocols without providing a complete transceiver signal processing system for each protocol. It may be desired, for example, to provide a Bluetooth interface, and it may further be desired to integrate the Bluetooth interface as a shared media access controller (MAC) interface with the WAVE MAC interface.

In one example of the invention shown in the time allocations of FIG. 2, an integrated WAVE and Bluetooth interface operates exclusively as a Bluetooth interface during an initial pairing interval $T_p$ 201, after which the integrated WAVE and Bluetooth interface commutates between a WAVE mode during Control CHannel (T1 CCH) 204, 212 and Service CHannel (T2 SCH) intervals 208, 216 of 46 ms each, and operates in a Bluetooth mode during Tg gap intervals of 4 ms 202, 206, 21, 214. In one such example, Bluetooth packets are transmitted by the baseband processor and RF front end as "streaming protocol" (SP) packets after pairing is completed. SP protocol packets are suitable for use in sending audio from a master device such as the multi-protocol transceiver of the present invention to a remote Bluetooth slave device. As SP packets are not acknowledged by the receiving device, the sender can send these packets in bursts without concern for receiving acknowledgement packets during the intervals the RF front end and baseband processor are operative in WAVE mode. In this example, Bluetooth packets are transmitted in dense bursts at a rate which exceeds the overall required throughput of the Bluetooth connection, thereby providing continuous audio streams. For example, a pair of channels receiving 44 Khz of data sampled to 12 bits per sample would ordinarily require 528 Kbps of continuous bandwidth over a Bluetooth channel which operated continuously, and likely interfering with the CCH and SSH intervals of FIG. 2, such as by out-of-band transmit frequency interference, in-band transmit frequency interference for protocols which share the same subcarrier frequencies. In the present example, if 3 ms of $T_g$ were used for Bluetooth communications (with 0.5 ms on either side used for isolation), such that if a 3 ms window of the 4 ms guard interval every 50 ms were used for Bluetooth data transmission, the Bluetooth SP data could be transmitted as 50/3 greater rate, so the Bluetooth data would be sent as 3 ms bursts of 8.8 Mbps during $T_g$ gap intervals 202, 206, 210, 214 of FIG. 2 and nothing would be sent the other 47 ms of each T1+Tg 50 ms interval when the station operated as a standards-compliant WAVE device during intervals 204, 208, 212, 216. More generally, where the Bluetooth packets provide a data rate of $R_{avg}$, and the Control Channel or the Service Channel has a duration $T_{cch}$, and the gap interval has a duration of $T_g$, and where Bluetooth packets are only transmitted during the gap intervals at a rate of $R_p$, then the data rate required during gap intervals is $R_p \geq R_{avg} (T_{cch}/T_g)$.

Figure 3:
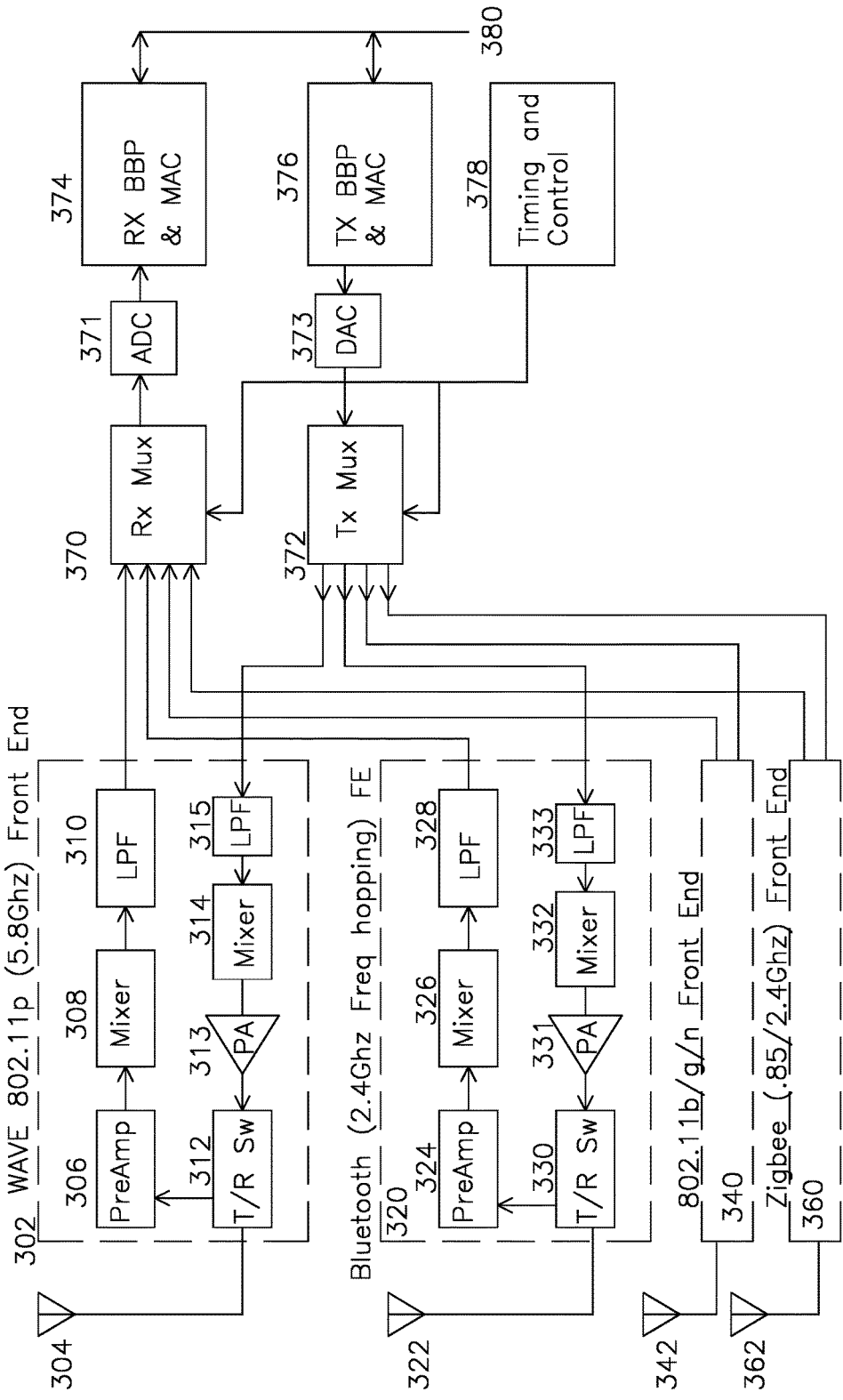
FIG. 3 shows an example embodiment of the invention for a four protocol baseband processor.

FIG. 3 shows an example integrated WAVE transceiver 300. A plurality of RF front ends 302, 320, 340, 360 are each adapted to provide wireless packet RF conversion to baseband for a particular wireless protocol, modulation type, and frequency by mixing with the carrier frequency Fc of the particular modulation and frequency scheme to baseband for ADC sampling. In one example embodiment of the invention, RF front end 302 is a WAVE front end, having an antenna 304 receiving WAVE protocol wireless packets at 5.8 Ghz, which are coupled through a transmit/receive switch 312 to preamplifier 306, mixer 308, and low pass filter (LPF) 310. Typically, the mixer 308 is a quadrature mixer with I (in phase) and Q (quadrature) outputs, and LPF 310 is a matched filter applied to each mixer output. The receiver generates a baseband analog signal which is coupled through a selected input of multiplexer 370 to Analog to Digital (ADC) converter 371, to baseband processor and media access controller 374, where the baseband processor is operative during T1 and T2 intervals for WAVE protocol packets and the corresponding WAVE front end 302 is selected in a WAVE mode during intervals T1 and T2 of FIG. 2 as controlled by timing controller 378. Bluetooth module 320 has a Bluetooth antenna 322 which couples received RF through TR switch 330 to preamplifier 324, mixer 326 typically operative with a 2.4 Ghz carrier frequency, and baseband low pass filters 328, which are provided to RF multiplexer 370, which in the present example is selected during a subset of Tg intervals (or more likely is operative as a Bluetooth receiver with the baseband processor configured exclusively for the Bluetooth protocol during the entire pairing interval), and the frequency hopping baseband signals are digitized and processed by baseband processor 374 which is operative in a Bluetooth mode during the sub-intervals of Tg when the Bluetooth module 320 is operative. In the previous example, the Tg intervals are selected by MUX 372 and baseband processor/MAC 376 for burst transmission of SP packets, during which the transmit baseband processor and MAC 376 are forming modulated frequency hopping packets, which are converted to analog baseband modulated signals by DAC 373, sent to a selected multiplexer Bluetooth RF front end 320 via multiplexer 372 output. Modules for other supported RF communication protocols, such as 802.11 WLAN 340 (operative at 2.4 Ghz or 5.2 Ghz) and ZigBee 360 (also operative in the 2.4 Guz ISM band) may be similarly provided.

Each of the plurality of RF front ends 302, 320, 340, and 360 provide a receive output which is selected by RX multiplexer 370, digitized 371, and processed by the baseband processor and MAC 374 according to the protocol active during that active T1 or T2 interval of time.

For each operative non-WAVE protocol, the transmit MAC and baseband processor 376 are active during a corresponding Tg interval of time outputting baseband symbols which are converted to analog signals 373, directed to the associated transmit interface through multiplexer 372, and transmitted to the appropriate antenna 322, 342, or 362, while the WAVE RF front end transmits and receives using antenna 304 during the T1 or T2 intervals which are exclusive of Tg.

Where multiple protocols are in use, the baseband processor and RF front end also save protocol and receive-specific parameters for future use in processing subsequently received packets, such as center frequency offset or symbol timing information for WAVE wireless packets, or the frequency hopping pattern and preamble synchronization sequence for Bluetooth wireless packets, so that switching between the two protocols preserves synchronization for received and transmitted wireless packets.

FIGS. 4A, 4B, and 4C (not to horizontal time scale) show alternative time slot assignments for the respective T1, Tg, and T2 of FIG. 2, where 402 T1 is the CCH interval, 404 Tg is the gap interval 206, 406 T2 is the T2 SCH interval, 408 is the Tg 210 interval, 410 T1 is the subsequent T1 interval, and 412 is the subsequent Tg interval. The time scale of FIGS. 4A, 4B, and 4C is depicted with greatly expanded Tg intervals to allow labeling, the T1 and T2 intervals remain 16 us, and the Tg interval remains 4 ms, 3 ms of which is used for transmissions during the Tg time, with the 0.5 ms window on either side of the 3 ms transmission time not shown for clarity. FIG. 4A shows the scheme previously described, where T1 and T2 are used for CCH and SCH frames, respectively, and Tg is used for one of either: Bluetooth, one of the 802.11 b/g/n/ac WLAN protocols, or ZigBee 802.15.4, or another RF protocol different than 802.11p. The use of the guard intervals 404, 408, 412, etc. is arbitrary, the baseband processors 374 and 376, and front end processor multiplexers 370 and 372, can select any particular protocol and any particular front end processor, typically in tandem with such selection by other stations on a pre-agreed format, particularly for time-sensitive packet types, such as TCP or any acknowledged packet type in 802.11. Non-acknowledged packet types such as UDP or broadcast packets can be sent at any time, as the transmission of this packet type does not require acknowledgement by a recipient. Alternatively, the acknowledgement may be ignored, such as an acknowledgement which is unable to be received because the baseband processor is operative for 802.11p packets at that moment.

FIG. 4C shows another interval assignment, where the gap intervals 404, 408, and 412 are used for any of 802.11, ZigBee, or Bluetooth, and the Control Channel (CCH) is not used for 802.11p, and this interval is used for any of Bluetooth, 802.11, or ZigBee communications.

I claim:

1. A multi-protocol transceiver comprising:
    a plurality of RF front ends, each said RF front end having an antenna port for receiving and transmitting wireless RF packets, a baseband transmit input and a baseband receive output, said plurality of RF front ends including a first RF front end operative for communications compatible with the IEEE 802.11p standard, and one or more RF front ends operative for a protocol different than IEEE 802.11p;
    a timing controller identifying gap intervals and channel intervals for 802.11p packets, said channel intervals comprising either a Control Channel interval or a Service Channel interval;
    a multi-protocol baseband processor having a transmit output and a receive input and operative for coupling to said first RF front end and at least one other said RF front end, said coupling being from said RF front end baseband transmit input to said multi-protocol baseband processor transmit output and from said RF front end baseband receive output to said multi-protocol baseband processor receive input, said multi-protocol baseband processor generating an 802.11p transmit output and accepting an 802.11p receive input during said channel intervals, said multi-protocol baseband processor operative to transmit and receive protocols other than 802.11p to said one or more RF front ends during said gap intervals.

2. The multi-protocol transceiver of claim 1 where said multi-protocol baseband processor receive input is coupled to said plurality of RF front ends through a digitizing receive multiplexer, the digitizing receive multiplexer having:
    a receive multiplexer having a plurality of inputs, each said receive multiplexer input coupled to a respective RF front end baseband receive output, said receive multiplexer selecting a single receive output from among said RF front ends and coupling said selected receiver output to an analog to digital converter (ADC) which generates an output delivered to said multi-protocol baseband processor receive input.

3. The multi-protocol transceiver of claim 2 where said multi-protocol baseband processor is operative for processing 802.11p baseband packets during said channel intervals, and is active for processing at least one protocol other than 802.11p during said gap intervals.

4. The multi-protocol transceiver of claim 1 where said multi-protocol baseband processor transmit output is coupled to one of said plurality of RF front end transmit input through a digitizing transmit multiplexer, the digitizing transmit multiplexer having:
    a digital to analog converter (DAC) having an input coupled to said multi-protocol baseband processor transmit output, said DAC having an output which is coupled to a transmit multiplexer, said transmit multiplexer having a plurality of outputs, each said transmit multiplexer output coupled to a respective one of said RF front end transmit inputs, where said transmit multiplexer couples said DAC output to the transmit input of a respective one of said RF front ends.

5. The multi-protocol transceiver of claim 4 where said multi-protocol baseband processor provides a baseband output which is compatible with 802.11p communications during said channel intervals, and said transmit multiplexer couples said DAC output to said first RF front end during said channel intervals, said transmit multiplexer coupling said DAC output to at least one said other RF front end transmit input during said gap intervals.

6. The multi-protocol transceiver of claim 1 where said baseband processor and said RF front end are operative for 802.11p WAVE protocols during said channel interval, and operative for at least one different protocol during said gap interval.

7. The multi-protocol transceiver of claim 1 where said channel intervals alternate between a Control CHannel and a Service CHannel.

8. The multi-protocol transceiver of claim 1 where said at least one said RF front end is operative for a Bluetooth protocol during said gap interval.

9. The multi-protocol transceiver of claim 1 where said baseband processor and one of said RF front ends other than said first RF front end is operative during said gap intervals to transmit or receive wireless Bluetooth packets.

10. The multi-protocol transceiver of claim 9 where said Bluetooth packets provide a data rate of $R_{avg}$, said Control Channel or said Service Channel has a duration $T_{cch}$, said gap interval has a duration of $T_g$, and said Bluetooth packets are transmitted during said gap intervals at a rate of $R_p$, where $R_p \geq R_{avg}(T_{cch}/T_g)$.

11. The multi-protocol transceiver of claim 1 where said channel intervals and said gap intervals are a canonical series of Control Channel interval, gap interval, Service Channel interval, and gap interval.

12. The multi-protocol transceiver of claim 1 where said baseband processor and at least one said RF front end is operative to transmit or receive at least one of: a Bluetooth, a 802.11a, a 802.11b, a 802.11g, a 802.11n, a 802.11ac, or a Zigbee protocol.

13. A multi-protocol transceiver having:
a first wireless RF front end operative to receive wireless 802.11p WAVE packets and provide a respective baseband receive output;
one or more wireless RF front ends operative to receive wireless packets other than 802.11p;
a multi-protocol baseband processor having a multi-protocol receive input;
a receive multiplexer having inputs coupled to said first wireless RF front end receive output and also each of said one or more wireless RF front end receive outputs, said receive multiplexer selecting a single RF front end baseband receive output which is coupled to an analog to digital (ADC) converter, thereby forming a digital input coupled to said multi-protocol baseband processor receive input;
a controller identifying 802.11p intervals and gap intervals and coupling said 802.11p RF front end to said multi-protocol baseband processor during said 802.11p intervals and a different RF front end to said multi-protocol baseband processor during said gap intervals.

14. The multi-protocol transceiver of claim 13 where said multi-protocol baseband processor is operative for 802.11p and also at least one of: Bluetooth, 802.11a, 802.11b, 802.11g, 802.11n, 80211ac, or Zigbee.

15. The multi-protocol transceiver of claim 13 where said 802.11p interval is a control channel interval which are of greater duration than said gap interval.

16. A multi-protocol transceiver having:
a first wireless RF front end operative to transmit 802.11p WAVE packets coupled to a baseband transmit input;
one or more wireless RF front ends operative to transmit packets other than 802.11p;
a controller identifying channel intervals and gap intervals;
a multi-protocol baseband processor having a multi-protocol transmit output which generates 802.11p packets during said channel intervals and packets for at least one different protocol during said gap intervals;
a multiplexer coupling said multi-protocol transmit output said first wireless front end transmit input during said channel interval and coupling said multi-protocol transmit output to one of said one or more wireless RF front end transmit inputs at other times;
said controller operative to couple said first wireless RF front end to said multi-protocol transmit output during channel intervals, and to couple said one or more wireless front ends to said multi-protocol baseband processor transmit output during said gap intervals.

17. The multi-protocol transceiver of claim 16 where said multi-protocol baseband processor is operative for 802.11p and at least one of: Bluetooth, 802.11a, 802.11b, 802.11g, 802.11n, 802.11ac, or Zigbee.

18. The multi-protocol transceiver of claim 16 where said first wireless front end and said multi-protocol baseband processor are operative for 802.11p packets during said channel intervals and operative for Bluetooth packets during said gap intervals.

* * * * *